US011936513B2

(12) United States Patent
Tormasov et al.

(10) Patent No.: US 11,936,513 B2
(45) Date of Patent: Mar. 19, 2024

(54) SYSTEM AND METHOD FOR ANOMALY DETECTION IN A COMPUTER NETWORK

(71) Applicant: Acronis International GmbH, Schaffhausen (CH)

(72) Inventors: Alexander Tormasov, Moscow (RU); Anatoly Stupak, Tettnang (DE); Serguei Beloussov, Costa del Sol (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 0 days.

(21) Appl. No.: 17/301,275

(22) Filed: Mar. 30, 2021

(65) Prior Publication Data

US 2022/0321397 A1    Oct. 6, 2022

(51) Int. Cl.
*H04L 41/0604* (2022.01)
*G06N 20/00* (2019.01)
*H04L 41/0631* (2022.01)
*H04L 41/0853* (2022.01)
*H04L 41/5041* (2022.01)
*H04L 43/065* (2022.01)
*H04L 43/0817* (2022.01)
*H04L 43/10* (2022.01)

(52) U.S. Cl.
CPC ......... *H04L 41/0627* (2013.01); *G06N 20/00* (2019.01); *H04L 41/064* (2013.01); *H04L 41/0856* (2013.01); *H04L 41/5041* (2013.01); *H04L 43/065* (2013.01); *H04L 43/0817* (2013.01); *H04L 43/10* (2013.01)

(58) Field of Classification Search
CPC ............... H04L 41/0627; H04L 41/064; H04L 41/0856; H04L 43/065; H04L 43/0817; H04L 43/10; G06N 20/00
See application file for complete search history.

(56) References Cited

U.S. PATENT DOCUMENTS

| | | | |
|---|---|---|---|
| 7,124,438 B2 | 10/2006 | Judge et al. | |
| 8,806,632 B2 | 8/2014 | Stefanidakis et al. | |
| 8,949,677 B1 * | 2/2015 | Brundage | G06F 11/0745 714/48 |
| 9,472,084 B1 * | 10/2016 | Barak | G08B 21/187 |
| 10,009,364 B2 | 6/2018 | Dasgupta et al. | |
| 10,042,697 B2 | 8/2018 | Rafiul | |
| 10,826,931 B1 | 11/2020 | Quan | |
| 11,513,878 B2 | 11/2022 | Kulaga et al. | |
| 2017/0063896 A1 | 3/2017 | Muddu | |
| 2017/0126709 A1 | 6/2017 | Baradaran et al. | |
| 2019/0166200 A1 * | 5/2019 | Cilfone | G06F 3/0659 |
| 2020/0314128 A1 * | 10/2020 | Hild | H04L 63/1416 |
| 2020/0319979 A1 * | 10/2020 | Kulaga | G06F 11/3006 |
| 2020/0379853 A1 * | 12/2020 | Beloussov | G06F 8/71 |
| 2020/0387797 A1 * | 12/2020 | Ryan | G06F 11/3006 |
| 2021/0014243 A1 * | 1/2021 | Kulaga | G06F 11/1464 |

(Continued)

OTHER PUBLICATIONS

European Search Report, EP 22 02 0088, dated Aug. 8, 2022.

*Primary Examiner* — Philip C Lee
(74) *Attorney, Agent, or Firm* — ESPE Legal Consultancy FZ-LLC

(57) ABSTRACT

An anomaly detection system uses an AI engine to analyze configurations and backups to identify and assess anomalies. Backup data and configurations are used to characterize events as either secure or insecure.

11 Claims, 7 Drawing Sheets

(56) References Cited

U.S. PATENT DOCUMENTS

2021/0019404 A1\* 1/2021 Strogov .............. G06F 11/1451
2021/0321325 A1\* 10/2021 Srivastava .......... H04L 41/0893
2022/0121528 A1\* 4/2022 Brenner ................. G06F 3/064

\* cited by examiner

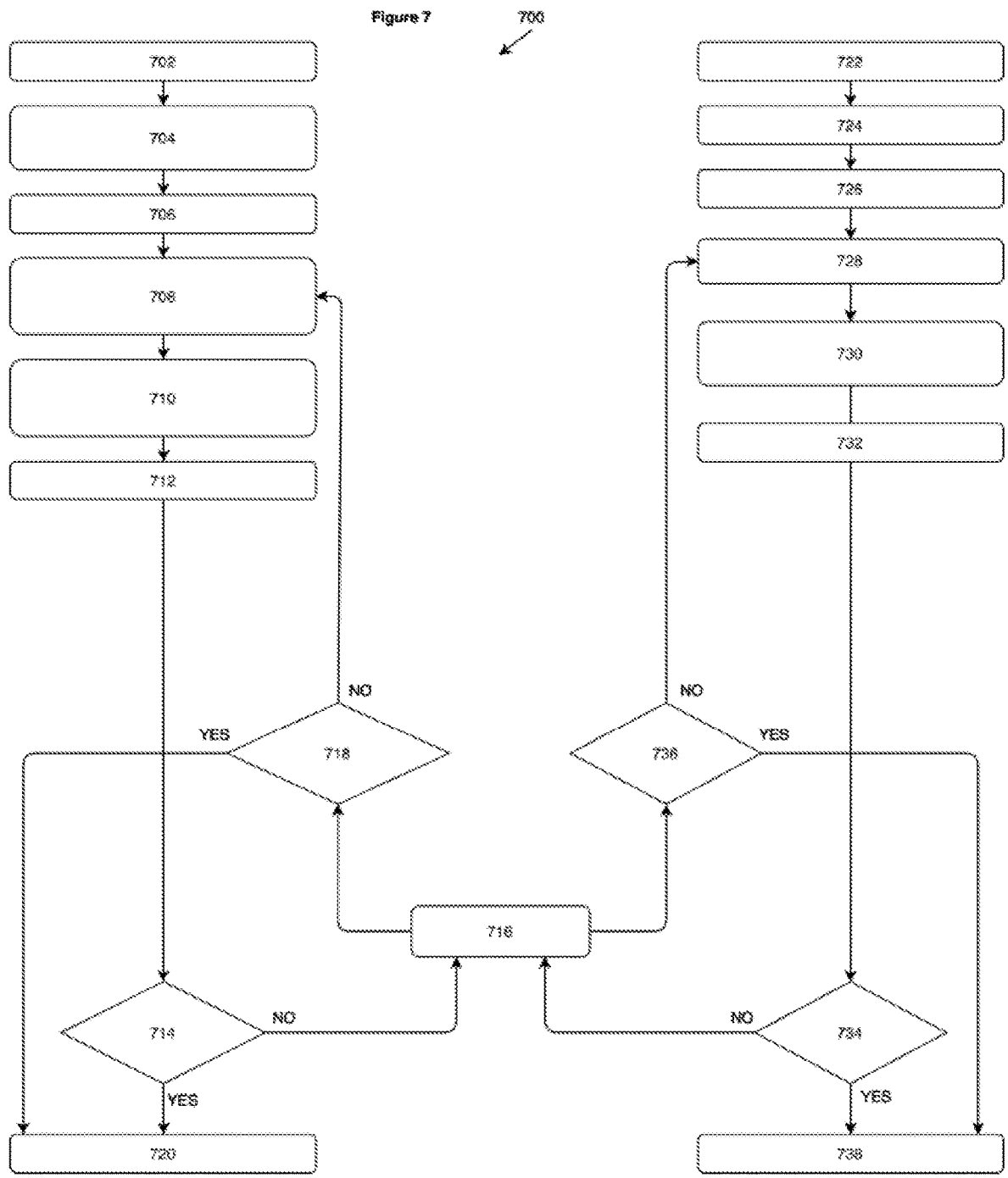

SYSTEM AND METHOD FOR ANOMALY DETECTION IN A COMPUTER NETWORK

TECHNICAL FIELD

The invention pertains to detecting anomalies in computer networks.

BACKGROUND

An ongoing problem in malware detection is the avoidance of false positives.

There are different methods to detect the activity of malicious software on shared network resources such as folders or network drives.

Cyberattacks can be linked with abnormal behavior by users and by computer systems generally, such as downloading corporate files or scanning shared storages for information. Other indicators include running scripts or sending commands to a target system when these vary from expected user behavior. Activities that may indicate an attack are called Indicators of Attack (IOA).

In practice, however, IOAs may result in massive false-positive detections because routine tasks for one use may be an IOA for another user.

Computer security is accomplished in part by malware-detection systems.

For example, a software developer may search for source code among various applications to fix issues or to investigate an implementation of a task. But such activity may also indicate intruder activity. To make malware detection more accurate and less burdensome for system users, there is a need to filter malicious or fraudulent activity from useful and safe activity.

In practice, new actions will appear anomalous. such as those related to new project initiation, data migration to a new server, or change of position by an employee. Such actions may be classified as anomalous even though they are legitimate and safe. Security systems that decrease the level of false positives rely on finely tuned detection rules and precisely defined exclusions. When these systems are implemented, they increase administration costs and require system administrators to add new detection rules and exceptions whenever there are changes in the system's organization or processes.

SUMMARY

An AI engine determines expected behavior of computer systems with particular configurations. Computer backups store information about the computer configurations, including hardware and software. Deviations from expected behavior are identified using profiles derived from backup information about system hardware and software.

The AI engine collects information about standard behavior patterns of computers with a particular configuration. In the case of deviation from the standard, the system warns of the possible activity of malicious software or intruder.

For example, when a computer tries to get access to a shared network folder, its configuration is analyzed and compared with behavior patterns for related configurations. Depending on the result of this analysis, the computer at issue can be classified as trusted or malicious.

In an embodiment, the method is executed on a processor, the method comprising: collecting a first set of system events associated with a network-entity activity for a first time period, determining activity patterns of the network entity from the first set of system events, wherein activity patterns characterize a safe operation of the network entity; collecting a second set of system events associated with a network-entity activity for a second time period; detecting anomalous activity of the network entity in a second time period, wherein the detection is performed by comparing the second set of system events with activity patterns of the network entity; determining network-entity configuration parameters in effect at first and second time periods; and determining a substantial cause of detected anomalous activity, wherein determination of a substantial cause is performed by correlating detected anomalous activity with a change of configuration parameters for the first and second time periods.

In alternative embodiments, the network entity is a shared network storage, a web-service, a system user, or a computing device.

In alternative embodiments, system events are collected from the event log or from external event management service or from the agent installed on a network entity or from the network traffic analyzer.

In another embodiment, a set of system events can include one or many system events.

In another embodiment, determining activity patterns is performed with machine learning techniques.

In another embodiment, the activity patterns represent a neural network model.

In another embodiment, detecting anomalous activity is performed with machine learning techniques.

In another embodiment, determining network entity configuration parameters is performed by extracting configuration parameters from a backup copy, related to a network entity.

In another embodiment, the method comprises: collecting system configurations of secure network entities, wherein system configurations are collected from backup copies of network entities; determining reference configurations for secure network entities; receiving a system configuration of a network entity; assessing security risks of the received system configuration, wherein the assessment is based on the deviation of the received system configuration from the reference configuration; and analyzing the activity of the network entity for anomalies if the assessed security risk exceeds a specified value.

In another embodiment, the method comprises collecting a first set of system events associated with a network entity's activity for a first time period; collecting a first set of system configurations of network entities, wherein the first set of system configurations is collected from backup copies of network entities for the first time period; determining configuration-related activity patterns of the network entities from the first set of system events and the first set of system configurations, wherein activity pattern depends on at least one configuration parameter of the first set of system configurations; receiving a second set of system events associated with network entity activity for a second time period; receiving a second set of system configurations associated with the network entity for a second time period; detecting anomalous activity of the network entity in a second time period, wherein the detection is performed by comparing the second set of system events and the second set of system parameters with activity patterns of the network entity; and creating a security-incident indication of a change in a system configuration parameter associated with the detected anomalous activity.

SUMMARY OF FIGURES

FIG. 7 shows a process for generating alerts at a security management server.

DETAILED DESCRIPTION

Figure 1:
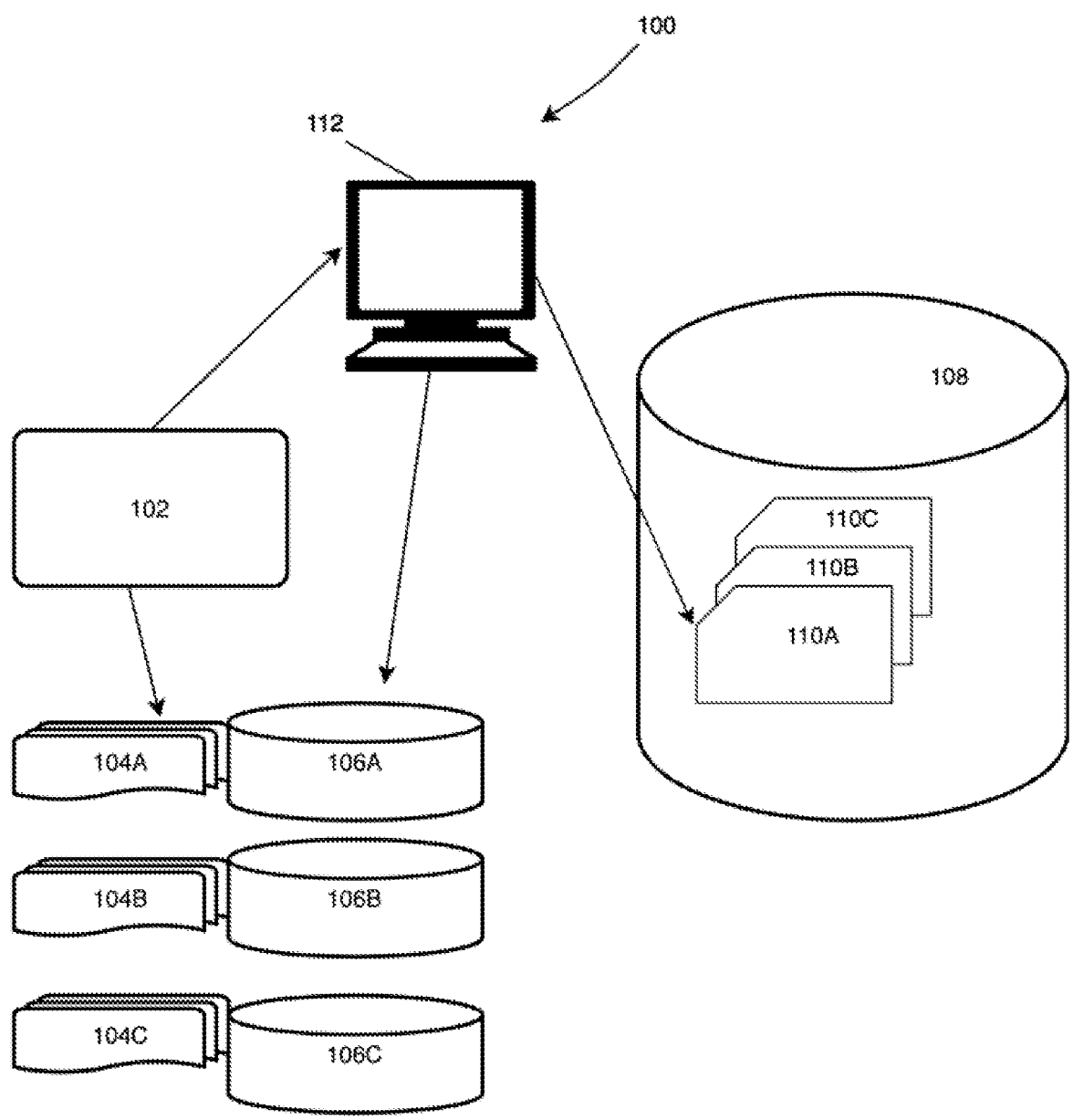
FIG. 1 shows an overview of an anomaly detection system.

An overview of an anomaly detection system is shown in FIG. 1. Anomaly detection system 100 includes an artificial intelligence (AI) engine 102 in communication with configurations 104A-C. These configurations are linked with corresponding backups 106A-C. Data storage 108 includes shared network folders 110A-C. Computer 112 communicates with shared network folders 110A-C, backups 106A-C and AI engine 102.

Figure 2:
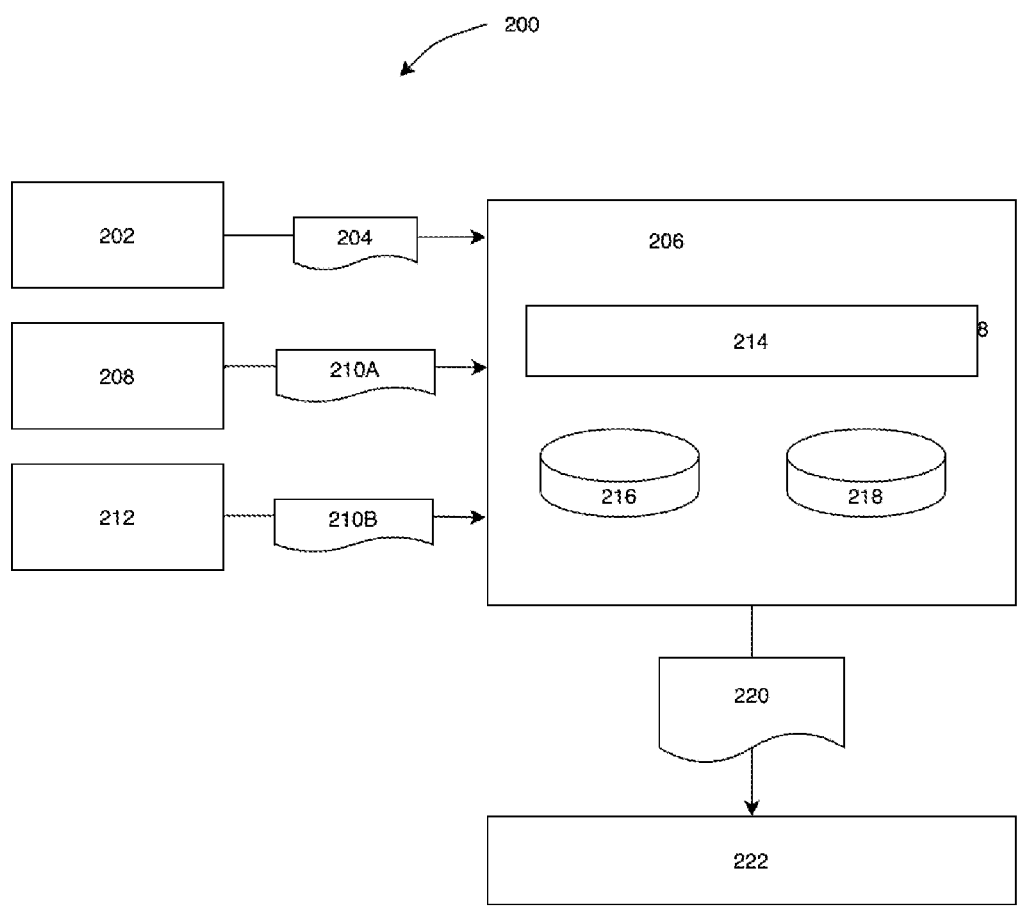
FIG. 2 shows an implementation of an anomaly detection system.

FIG. 2 shows anomaly detection system 200 with activity monitor 202, which sends events 204 to behavior analyzer 206. Events 204 include system events such as event logs, system drivers, and proxies. Backup 208 sends configurations 210A to behavior analyzer 206. Behavior analyzer 206 also receives system configurations 210B from system configuration manager 212.

Behavior analyzer 206 comprises AI anomaly detector 214 and also has access to a collection of configuration-related user activity profiles 216 and a collection of network resource activity profiles 218. Anomalies 220 related to configuration changes are sent to security management server 222.

Activity monitor 202 analyses the system behavior by intercepting system calls or network traffic. Activity monitor 202 can be implemented as a proxy or system driver that hooks system operations like creating a process, running applications, reading or writing a file, transferring data through the network, or modifying registry data. Activity monitor 292 monitors operations of a particular system application, such as a browser, file manager, business-focused applications. Activity monitor 202 can also register all operations in a web application on a client and server side, monitoring all web-requests and responses. Activity monitor 202 uses external event logs and event storages as an event source. These sources include for example security information event managements (SIEM), log-management systems, operating system event logs, or other sources of information about activity of a target system or user.

Behavior analyzer 206 uses machine learning algorithms to generate a neural model that can classify events as anomalous. Behavior analyzer 206 operates with intercepted system events or system events stored in event-management systems, like SIEM, log management, or event journals.

Behavior analyzer 206 works with predefined and updatable detection rules or signatures. In an alternative embodiment, behavior analyzer 206 can be an expert system and work with a subset of detection rules added by a security administrator. In this embodiment, the need for training on an existing corporate system can be reduced or eliminated. Behavior analyzer 206 detects events and event sequences specified in detection rules that can harm corporate network or corporate data.

Behavior analyzer 206, when adapted to corporate networks, may employ techniques such as blacklists and whitelists. Other techniques include analysis of events and assets and making user-centric and asset-centric risk assessments.

Behavior analyzer 206 can be based on machine-learning algorithms. Such analyzers first train on collected events from a target system or network. Behavior analyzer employs machine learning techniques, including Supervised, Unsupervised, Reinforcement or Hybrid Learning. In different scenarios behavior analyzer can utilize different algorithms for user activity profiling, shared network resource activity profiling, and network activity profiling As a result of the training process, behavior analyzer 206 generates neural network models, representing different types of activity profiles. Using these models, behavior analyzer 206 classifies each particular system action or a sequence of system actions as a threat or potential harmful activity by detecting deviations from profile activity patterns. The profile can be created for a particular user, application, or the system as a whole.

Figure 3:
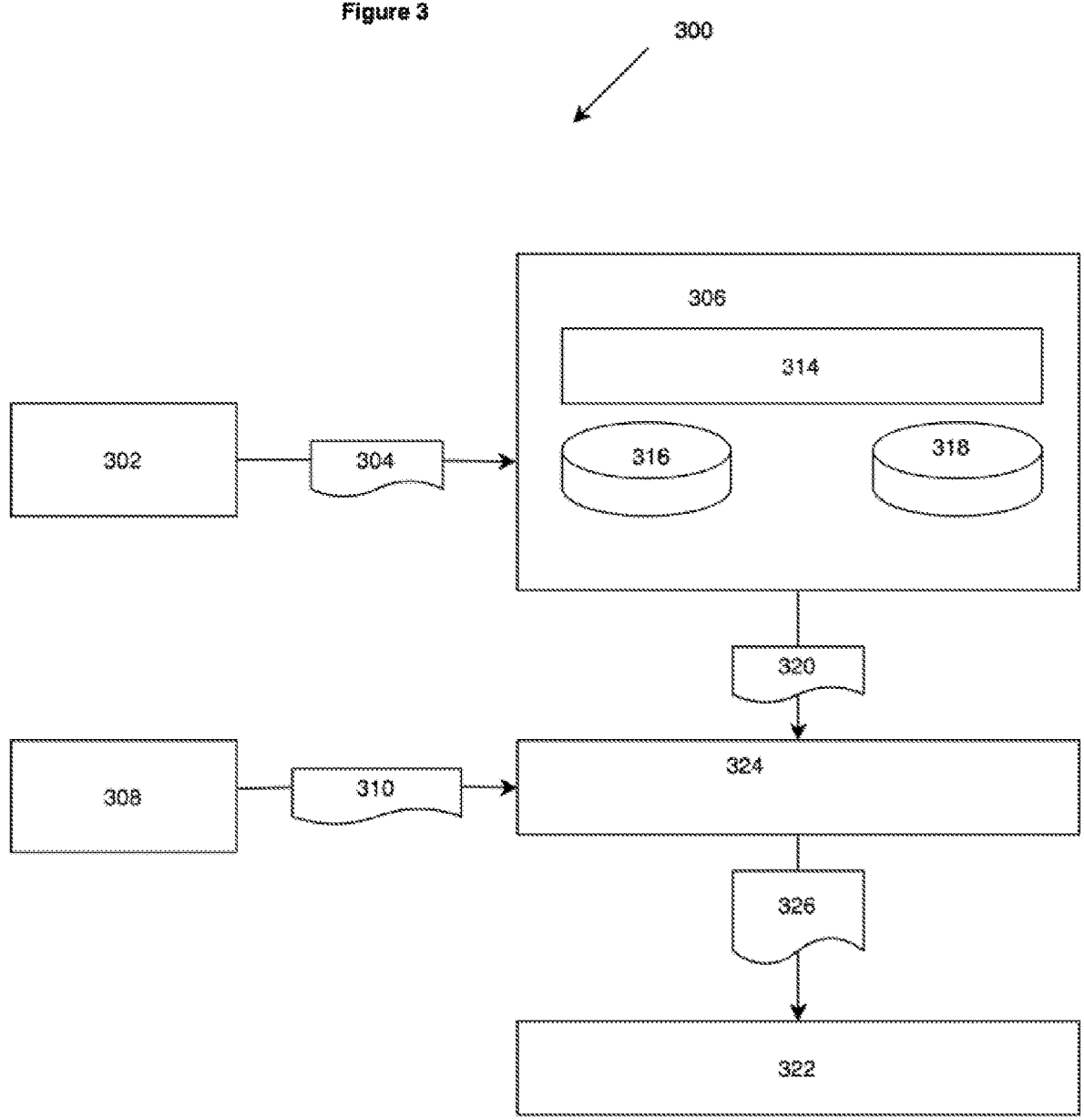
FIG. 3 shows a second implementation of an anomaly detection system.

FIG. 3 shows an alternative anomaly detection system 300. Activity monitor 302 sends events 304 to behavior analyzer 306. Behavior analyzer 306 includes AI anomaly detector 314 and user activities 316 and network resource activity profiles 318. Behavior analyzer 306 sends anomalies 320 to correlator 324. Correlator 324 also receives configurations 310 from backup server 308. Security incidents 326 are reported to security management server 322. Activity monitor 302 and behavior analyzer 306 function in the same way as described above with reference to FIG. 2.

Backup server 308 stores data about system history, including past and current system configurations, user activity, installed applications, connections, and other distinctive aspects of the system.

Correlator 324 compares anomalies with configurations. Correlator 324 also processes all verdicts from behavior analyzer 306 and correlates them with system configurations 310. In alternative embodiments, correlator 324 can be implemented as an expert system or artificial intelligence system.

Correlator 324 collates one or more anomalies, such as deviations from activity patterns, with system configuration information, that may include hardware configurations, such as those found in connected storage devices and network adapters. Other anomalies include application configurations, such as those found in settings, updates, registry keys, and application files. Anomalies may also be found in system configurations, including those for system users, running processes, operating system settings, installed applications, system files and user files, connected networks, and active sessions. Other sources of anomalies are user parameters, such as permissions, titles, and certificates.

Figure 4:
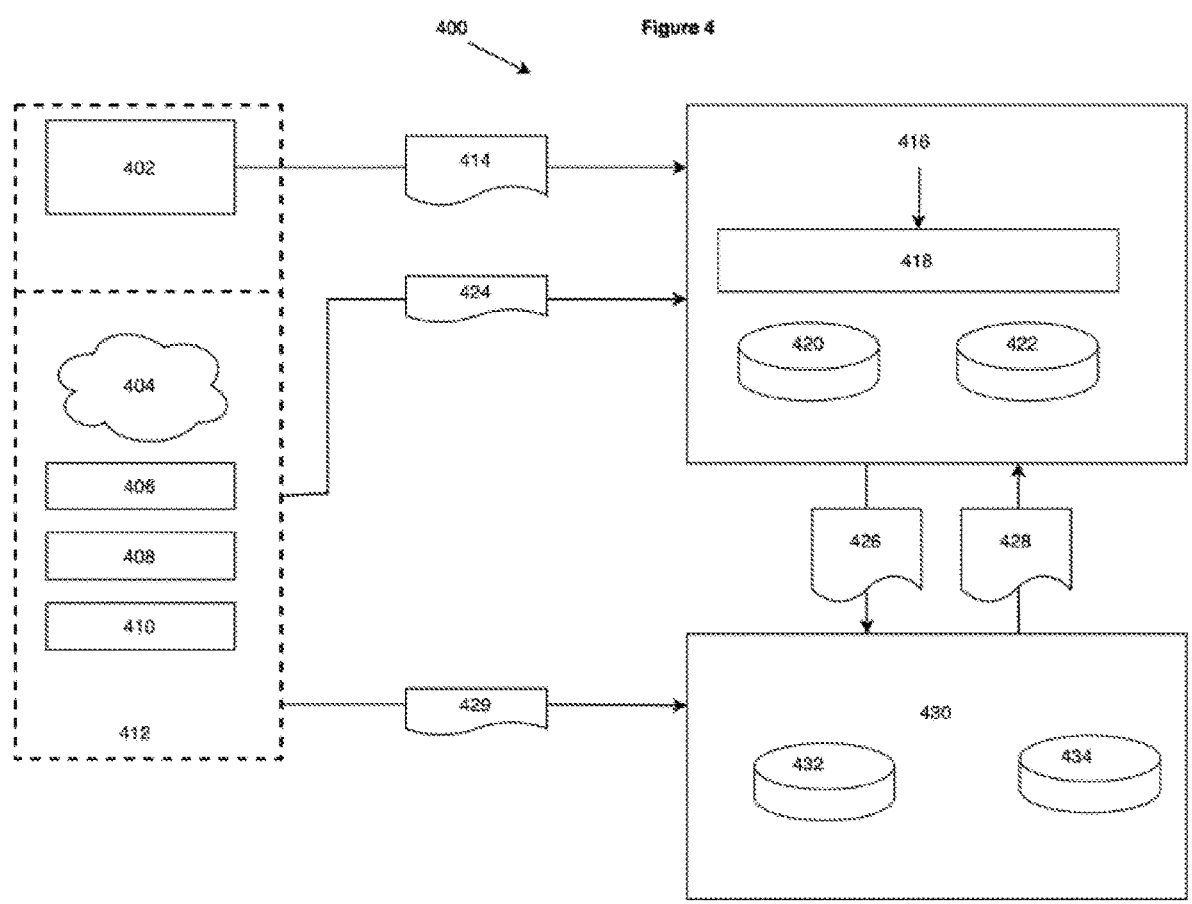
FIG. 4 shows a third implementation of an anomaly detection system.

FIG. 4 shows alternative anomaly detection system 400. Backup 202, cloud 404, severs 406, personal computers 408, and mobile devices 410 are part of corporate infrastructure 412. Backup 202 sends configuration histories 414 to configuration analyzer 416. Configuration analyzer 416 is in connection with artificial intelligence classifier 418. Secure configuration profiles 420 and insecure configuration profiles 422 are also part of configuration analyzer 416. Configuration classification verdicts 426 and events 429 are received by threat analyzer 430. Threat analyzer 430 includes secure activity profiles 432 and insecure activity profiles 434. Threat analyzer 430 sends security alerts 428 to configuration analyzer 416.

Configuration analyzer 416 determines a typical configuration of a group of assets that characterize a specific condition, such as when assets are operating securely, have optimized performance, or suffer from a vulnerability. A typical configuration may be determined for assets grouped by device type, such as mobile devices, PCs, or servers, or by device role, such as file server, web-server, terminal, or mail server. Alternate groups are users of assets, such as system administrators, developers, financial specialists, and remote workers. Still other groups include network segments, such as a range of IP addresses, domains, and other aspects of a network. Possible groups also include installed applications, drivers or operating systems, as well as system events associated with assets, such as assets connected to a network resource.

Figure 5:
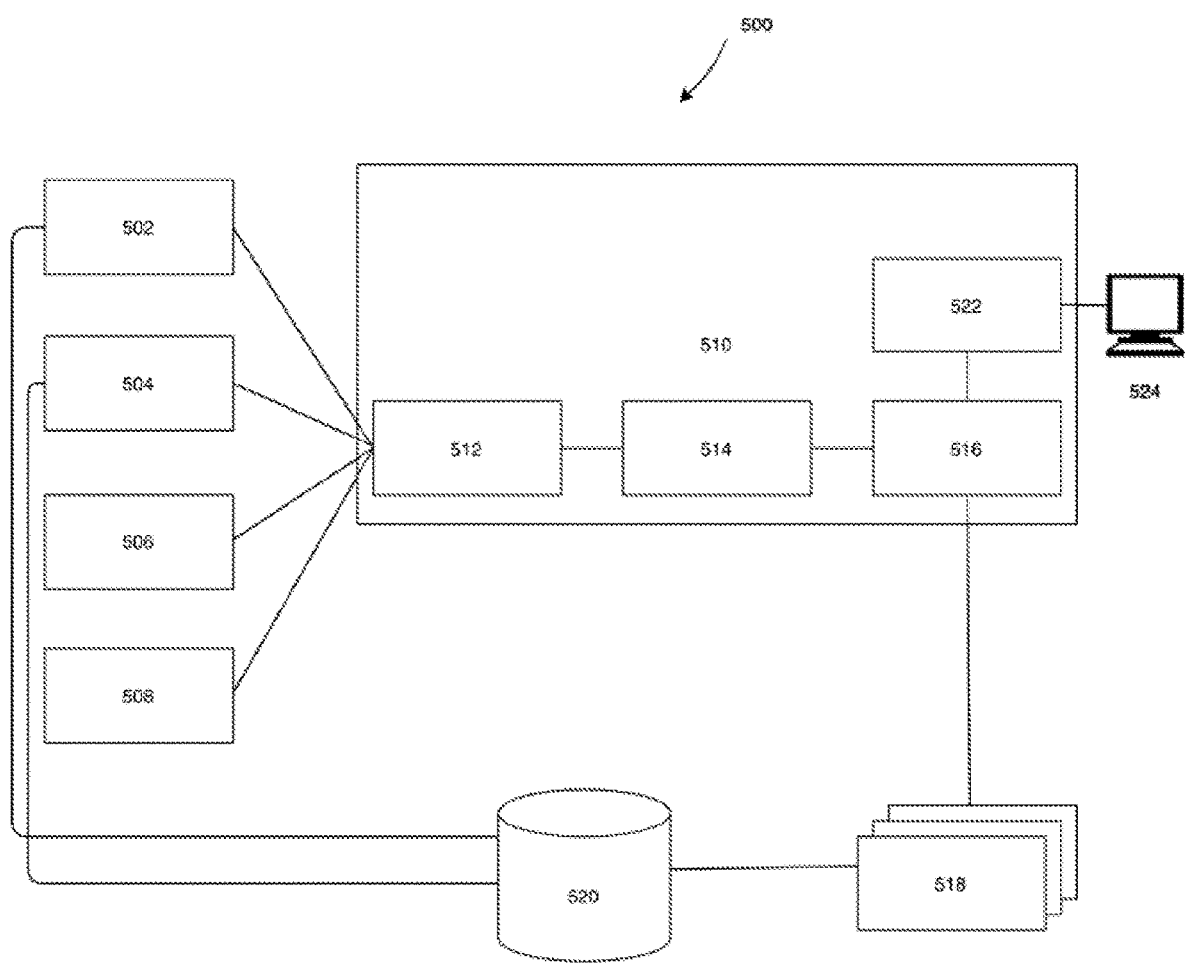
FIG. 5 shows a fourth implementation of an anomaly detection system.

An alternative anomaly detection system 500 is shown in FIG. 5. Personal computer 502, server 504, SIEM/log server 506, and router/network proxy 508 all communicate with security system 510 by way of activity monitor 512. Activity monitor 512 is coupled to behavior analyzer 514, which in turn communicates with correlator 516. Correlator 516 has access to configurations 518. Configurations 518 are received from backup 520, which stores backups of personal computer 502 and server 504.

Figure 6:
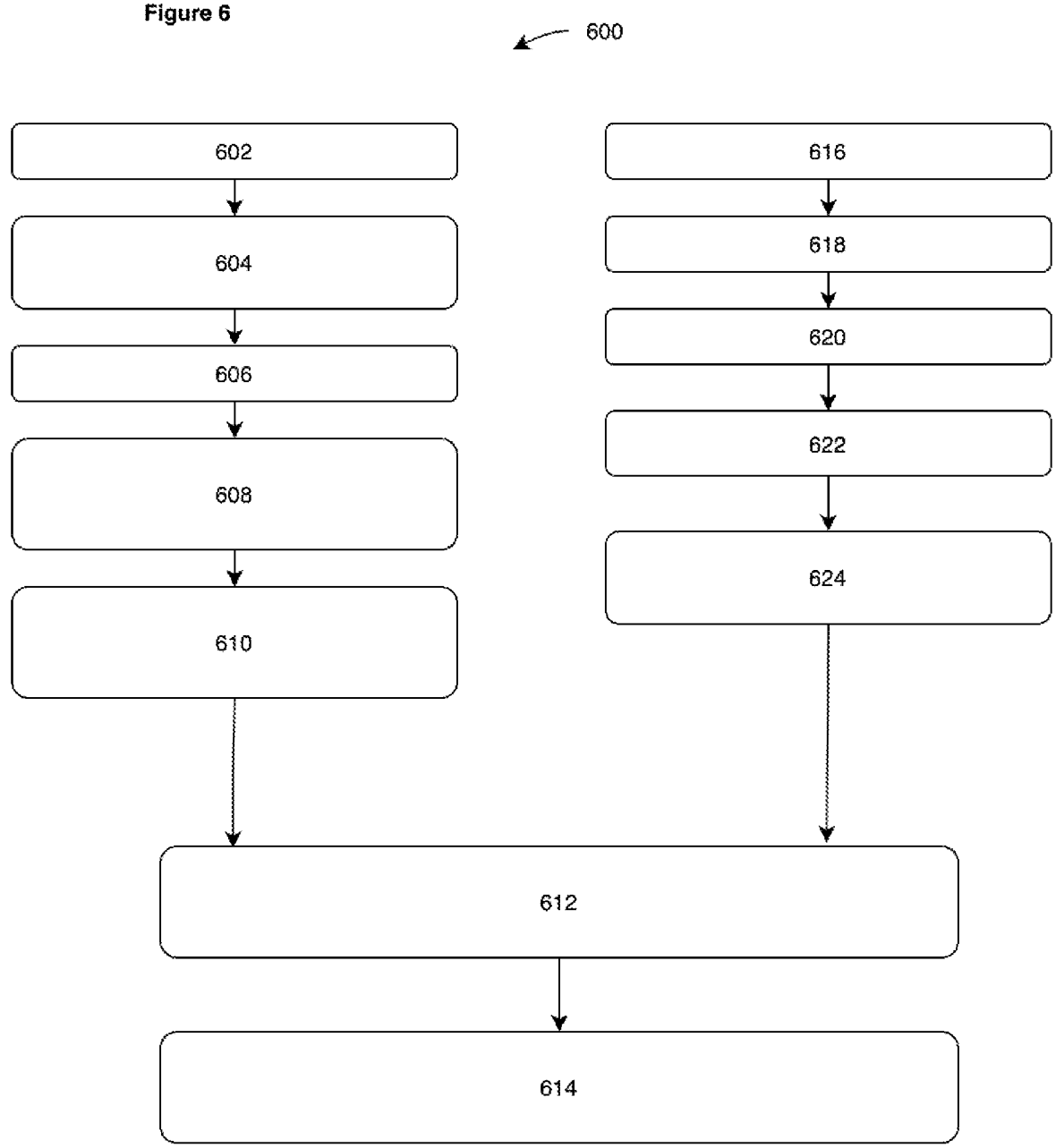
FIG. 6 shows a process for creating a security-incident indication.

A process for creating a security-incident indication is shown in FIG. 6. The process 600 begins by analyzing system configurations at step 602. The process continues at step 604 by getting system configurations for a group of asserts. Secure configuration profiles are determined for a group of assets at step 606. At step 608, system configurations are received of a target asset. Then at step 610, the secureness of a target system configuration is determined based on AI and defined configuration profiles. Verdicts about system configuration secureness and verdicts about monitored system secureness are correlated at step 612. Finally, at step 614 a security-incident indication is created of a change in a system configuration parameter associated with the detected anomalous activity.

In parallel with steps 602-610, system activity analysis begins at step 616. At the next step 618, analysis of system activity of a group of assets begins. Then at step 620 a determination is made about secure activity profiles for a group of users. Monitoring of system activity by a target asset begins at step 622. Secureness of a monitored activity based on an AI module and a defined source of activity preferences is determined at step 624.

A process 700 for generating alerts at a security management server is shown in FIG. 7. The process begins by analyzing system configurations at step 702. Then system configurations for a group of assets, including system configurations loaded from a backup, are retrieved at step 704. Secure configuration profiles for a group of assets are determined at step 706. At step 708, a system configuration of a target asset is received. The secureness of the target system configuration is determined at step 710 based on an AI module and defined secure configuration profiles. A verdict is sent to the behavior analyzer at step 712 to correct secure activity profiles.

A decision is made at step 714 whether the target system configuration is secure. If not, an alert is generated in the security management server at step 716. After step 716, a decision is made at step 718 whether the target system configuration is analyzed. If so, then the process continues to step 720 with receiving the next system configuration for analysis.

In the alternative, if the decision at step 714 is yes, then the process proceeds directly to step 720.

In parallel with steps 702-720, system activity analysis begins at step 722. At step 724, system activity of a group of assets is analyzed. Then at step 726 a determination is made about secure activity profiles for a group of users. Monitoring of system activity by a target asset begins at step 728. Secureness of a monitored activity based on an AI module and a defined source of activity preferences is determined at step 730. At step 732, a verdict is sent to the configuration analyzer to correct secure configuration profiles.

A decision is made at step 734 whether target system activity is secure. If not, the process moves to step 716 by generating an alert. Then a decision is made whether the target system activity is analyzed at step 736. If not, the process returns to step 728. If yes, then the process moves to step 738 by continuing with monitoring the next system activity for analysis.

The anomaly detection systems described above detect anomalies using configuration history, extracted from backup data. In one implementation, anomalies are correlated with configurations. Alternatively, the behavior analyzer receives system events related to activities.

In another embodiment, the anomaly detection system accesses large numbers of backup copies. For example, by increasing the set of assets for analysis from 1000 to 10,000 that include backup copies of assets, the anomaly detection system has sufficient configurations and security profiles to get a more reliable set of results.

Backup data taken at regular intervals reveals when an insecure security profile was introduced in the series of backups, allowing the anomaly detection system to identify the amount of time the insecure profile was in use in the system before being detected.

Searches for backup slices target configurations and changes in configurations over time. Such searches allow for more accurate detection of malware than scans of application programs alone.

Analysis of backups preferably includes analysis of how often the backups change or how often the system is restored. For example, if a configuration is not changed frequently or has never been restored, then configuration changes can be classified incorrectly as insecure because the number of configurations analyzed is too small. Strong security policies might be incorrectly imposed for the asset because of abnormal behavior and abnormal configurations in view of the sample size. In systems where configurations change frequently, such as every day or every hour, the same configuration changes that are anomalies for a small sample are not anomalies at all, but regular patterns. Further, given the nature of the system's use, for example a business user's configurations will be unlikely to change significantly while a software developer's configurations may undergo major changes.

To speed up processing times for the anomaly detection system, security labels can be assigned to configuration and activity profiles. For example, one label can be assigned to a developer's configurations and another label assigned configurations for ordinary workstation users. These security labels can be defined by certain configurations and activities. For example, a developer label is used for a configuration when some number n criteria are met that backup data show to be commonly found in developer configurations. By using labels, profiles can be approximations based on configuration data clusters. The anomaly detection system can then create specific sets of security policies based on security labels. These security labels can be applied efficiently to large data by reducing the number of variables that need to be considered. For example, if at least 6 criteria, which could be weighted in view of their relative importance, are met by a set of configurations then the label is applied and processing stops for that set of configurations.

The invention claimed is:

1. A computer implemented method of automated cause analysis for network-entity anomalous activity, the method executed on a processor, the method comprising:
storing a first backup slice of a network entity;
collecting a first set of system events associated with a network-entity activity for a first time period;
determining a first activity pattern of the network entity from the first set of system events, wherein the first activity pattern characterizes a safe operation of the network entity;
detecting a change of a configuration parameter of the network entity;
storing a second backup slice of the network entity in response to the detected change in the configuration parameter;
collecting a second set of system events associated with the network-entity activity for a second time period, wherein the second time period starts when a change of a configuration parameter is detected or when the second backup slice is stored;
detecting an anomalous activity of the network entity based on the second set of system events;
determining network-entity configuration parameters in effect at the first time period corresponding to the first backup slice and at the second time period corresponding to the second backup slice;
determining a substantial cause of the detected anomalous activity, wherein determination of the substantial cause is performed by determining changed configuration parameters between the first and second backup slices.

2. The method of claim 1, wherein the network entity is a shared network storage.

3. The method of claim 1, wherein the network entity is a web-service.

4. The method of claim 1, wherein the network entity is a system user.

5. The method of claim 1, wherein the network entity is a computing device.

6. The method of claim 1, wherein the first or second set of system events are collected from an event log or from external event management service or from an agent installed on the network entity or from a network traffic analyzer.

7. The method of claim 1, wherein the first or second set of system events can include one or many system events.

8. The method of claim 1, wherein determining the first activity patterns is performed with machine learning techniques.

9. The method of claim 8, wherein the first activity patterns represent a neural network model.

10. The method of claim 1, wherein detecting the anomalous activity is performed with machine learning techniques.

11. The method of claim 1, wherein determining the network entity configuration parameters is performed by extracting configuration parameters from a backup copy taken at the first or second time period, related to the network entity.

* * * * *